Patented Sept. 5, 1922.

1,428,030

UNITED STATES PATENT OFFICE.

WILLIAM H. HEATON, OF SHAWNEE, KANSAS.

AUTO STEP.

Application filed April 11, 1921. Serial No. 460,351.

*To all whom it may concern:*

Be it known that I, WILLIAM H. HEATON, a citizen of the United States, and resident of Shawnee, county of Johnson, State of Kansas, have invented a certain new and useful Improvement in Auto Steps, of which the following is a complete specification.

This invention relates to automobile steps and one of its objects is to produce a disappearing step which may be readily and easily assembled on a car.

Another object is to produce a disappearing step controlled by the opening and closing of a door.

A still further object is to produce a door-controlled step which, when in inoperative position is entirely hidden from view and offers no projecting portions to be struck by a passing vehicle or to collect and retain mud or water.

A further object is to produce a step of this character of simple, strong, durable, efficient and inexpensive construction, and in order that it may be fully understood, reference is to be had to the accompanying drawing, in which:

Figure 4 is a section on the line IV—IV of Figure 2.

Figure 1:
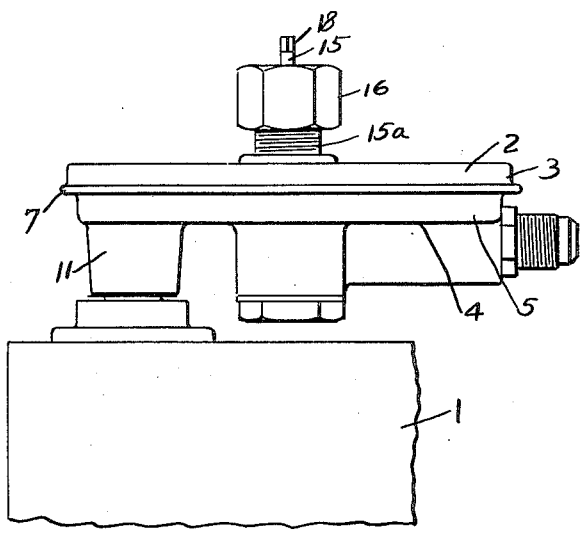
Figure 1 is a perspective view of a fragment of an automobile showing a door in open position and the step projected in operative position.
Figure 2:
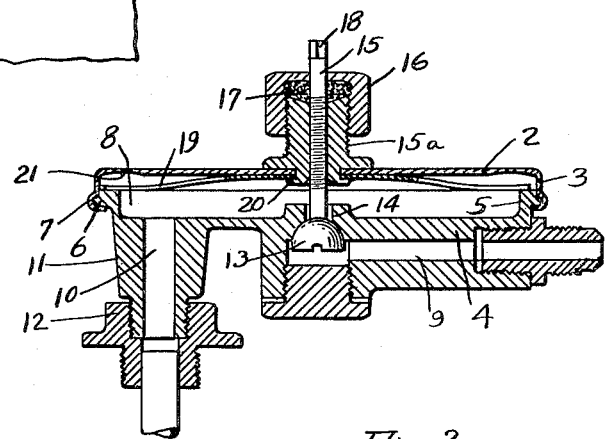
Figure 2 is a section on the line II—II of Figure 3.
Figure 3:
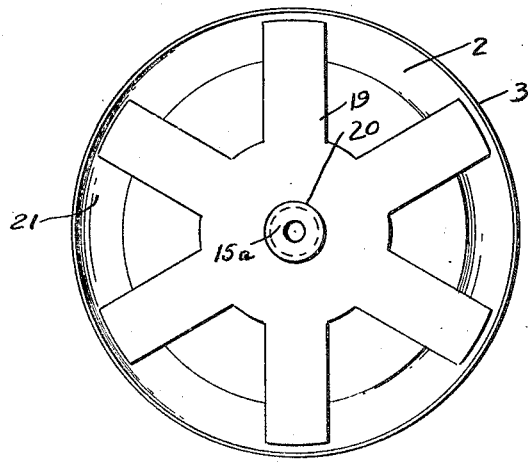
Figure 3 is a section on the line III—III of Figure 2.

In the said drawing, where like reference characters identify corresponding parts in all of the figures, 1 is one of the frame members of the chassis, in this instance of channel form, 2 the floor of the automobile, 3 the body thereof, and 4 a right-angle shaped protector guard fitted between the floor of the automobile and extending downwardly over the outside face of the frame 1. 5 is the customary automobile door, equipped with latching means 6 and pivoted near its upper edge by means of a hinge member 7.

Bolted or secured in any other suitable manner to the underside of the frame 2 and below a door opening, is a supporting member 8 which carries a pair of inwardly extending channel supports 9, provided with channels in their opposing faces for the reception of a disappearing step 10, the step being of somewhat greater length than necessary in order that when in projected position it will still have sufficient bearing surface in supports 9 to efficiently carry the weight of a person entering the automobile, and near its inner end has an operating slot 11 for the reception of the down-turned end of a crank arm 12, equipped at its end with a collar 13 to prevent disengagement of said arm with the step. The crank arm at its other end extends vertically upward through perforations in the channeled frame 1 and the floor 2. It will be noted that the crank arm will have a bearing in these perforations just mentioned. Near its upper end the crank arm passes through a hinge bracket 14 secured to the body 2 of the car, the upper end of said crank arm being squared as at 15 for fitting in a squared opening formed in a hinge bracket 16 secured to the door and abutting at its lower edge against the hinge bracket 14. It will be understood that the door in opening will turn the crank arm, which will act as a pivot pin in the bracket 14 and the perforations in the frame and floor.

It has been found desirable to protect the step when in inoperative position from mud, water and the like, which might be splashed up on same, and to accomplish this function, a plate 17 is secured to the under edges of the channel supports 9.

The operation of the step is as follows: When the door is opened, the crank arm will be turned in its bearings and the down-turned end will slide in the slot 11 of the step and at the same time press against the side of the slot and force the step to slide in the channel supports 9 and be projected outwardly from the side of the automobile a sufficient distance for convenient use. The reverse or closing movement of the door will cause the parts to act contrary to the action above described and the step will be moved inwardly.

From the above description, it will be apparent that I have produced a step of the character set forth which possesses all of the features pointed out as desirable, and while I have described and claimed the preferred embodiment of the same, I reserve the right to make all changes properly falling within the spirit and scope of the appended claims.

I claim:

1. The combination in an automobile of a door hinged to the automobile, a crank arm having fixed engagement with the door and F. J. HEIDEMAN.
EXPANSION VALVE FOR REFRIGERATING APPARATUS.
APPLICATION FILED JAN. 30. 1920.

1,428,031.

Patented Sept. 5, 1922.

Inventor
Fred J. Heideman

By
B. J. Wheeler
Attorney